(12) United States Patent
Poston et al.

(10) Patent No.: US 8,907,988 B2
(45) Date of Patent: Dec. 9, 2014

(54) SYSTEMS AND METHODS FOR DISPLAYING AND VIEWING DATA MODELS

(75) Inventors: Ricky Poston, Austin, TX (US); Ting He, Austin, TX (US); Michael Cooper, Houston, TX (US)

(73) Assignee: BMC Software, Inc., Houston, TX (US)

( * ) Notice: Subject to any disclaimer, the term of this patent is extended or adjusted under 35 U.S.C. 154(b) by 527 days.

(21) Appl. No.: 13/174,374

(22) Filed: Jun. 30, 2011

(65) Prior Publication Data

US 2013/0002723 A1 Jan. 3, 2013

(51) Int. Cl.
*G09G 5/00* (2006.01)
*G06F 3/0482* (2013.01)

(52) U.S. Cl.
CPC .... *G06F 3/0482* (2013.01); *G06F 2203/04803* (2013.01); *G06F 2203/04805* (2013.01)
USPC .......................................... 345/660; 345/619

(58) Field of Classification Search
USPC ................. 345/440, 441, 641, 647, 660, 619; 715/764, 853
See application file for complete search history.

(56) References Cited

U.S. PATENT DOCUMENTS

| | | | |
|---|---|---|---|
| 5,619,632 A * | 4/1997 | Lamping et al. | ............. 345/441 |
| 5,929,864 A | 7/1999 | Picott et al. | |
| 6,182,249 B1 | 1/2001 | Wookey et al. | |
| 6,356,285 B1 | 3/2002 | Burkwald et al. | |
| 6,425,006 B1 | 7/2002 | Chari et al. | |
| 6,590,587 B1 | 7/2003 | Wichelman et al. | |
| 6,639,614 B1 | 10/2003 | Kosslyn et al. | |
| 7,379,061 B2 | 5/2008 | Castonguay et al. | |
| 2003/0033402 A1 * | 2/2003 | Battat et al. | .................... 709/224 |
| 2004/0125138 A1 * | 7/2004 | Jetha et al. | ..................... 345/764 |
| 2004/0252128 A1 | 12/2004 | Hao et al. | |
| 2005/0273730 A1 * | 12/2005 | Card et al. | ..................... 715/853 |
| 2007/0211056 A1 | 9/2007 | Chakraborty et al. | |
| 2008/0010605 A1 * | 1/2008 | Frank | ............................ 715/765 |
| 2009/0217099 A1 | 8/2009 | Kato | |
| 2010/0033503 A1 * | 2/2010 | Baar et al. | ..................... 345/647 |
| 2010/0045702 A1 * | 2/2010 | Doyle et al. | .................. 345/641 |
| 2011/0148880 A1 | 6/2011 | De Peuter | |
| 2011/0234595 A1 | 9/2011 | Poston | |
| 2011/0316856 A1 | 12/2011 | Poston et al. | |
| 2012/0036484 A1 | 2/2012 | Zhang et al. | |
| 2012/0053986 A1 | 3/2012 | Cardno et al. | |

OTHER PUBLICATIONS

Martin, Wattenberg, "Visual Exploration of Multivariate Graphs", Proceedings of ACM CHI 2006 Conference on Human Factors in Computing Systems, ACM Press, 2006, pp. 811-819.

* cited by examiner

*Primary Examiner* — Chante Harrison
(74) *Attorney, Agent, or Firm* — Brake Hughes Bellermann LLP (57) ABSTRACT

A computer program product is tangibly embodied on a computer-readable medium and includes executable code that, when executed, is configured to cause a data processing apparatus to display multiple objects in a single pane, where the multiple objects are visual representations of real objects and the multiple objects are dynamically sized and spaced relative to one another to fit all of the objects in the single pane. The computer program product includes executable code that, when executed, causes the data processing apparatus to display a subset of the objects and associated metadata in an examination frame. The examination frame is sized to fit within the single pane, where the subset of the objects displayed within the examination frame are sized larger than the objects outside of the examination frame.

24 Claims, 6 Drawing Sheets

SYSTEMS AND METHODS FOR DISPLAYING AND VIEWING DATA MODELS

TECHNICAL FIELD

This description relates to systems and methods for displaying and viewing data models.

BACKGROUND

Graphs of models of data can be very large and difficult to navigate and to view. For example, graphs of complex data models (e.g., cloud computing models) that show thousands of nodes may be difficult to navigate and to view. Expansion and contraction of branches in the data models may create graphs that show even more nodes.

In certain scenarios, for example, the graphs of data models may represent objects in a cloud computing environment, where a status of the objects is monitored. With such a large number of objects, it may be difficult to monitor the status of each object and may be difficult for a user monitoring the graph to view the entire graph, even when using a large screen such as at a large screen operations center display. Also, on such a large screen, smaller objects may be difficult to see. It may be desirable to provide systems and methods to improve the display and the navigation of objects in a graph.

SUMMARY

According to one general aspect, a computer program product is tangibly embodied on a computer-readable medium and includes executable code that, when executed, is configured to cause a data processing apparatus to display multiple objects in a single pane, where the multiple objects are visual representations of real objects and the multiple objects are dynamically sized and spaced relative to one another to fit all of the objects in the single pane. The computer program product includes executable code that, when executed, causes the data processing apparatus to display a subset of the objects and associated metadata in an examination frame. The examination frame is sized to fit within the single pane, where the subset of the objects displayed within the examination frame are sized larger than the objects outside of the examination frame.

Implementations may include one or more of the following features. For example, the examination frame may be movable within the single pane and the objects within the single pane may be dynamically sized and spaced based on positions of the objects relative to a position of the examination frame. A size of the examination frame may be configurable. A visual representation of the subset of the objects and the associated metadata in the examination frame may be configurable.

In one exemplary implementation, the computer program product may include executable code that, when executed, is configured to cause the data processing apparatus to filter the subset of objects in the examination frame such that only objects having designated criteria are displayed in the examination frame.

In one exemplary implementation, the computer program product may include executable code that, when executed, is configured to cause the data processing apparatus to display additional objects in one or more additional single panes, where the additional objects in the additional single panes have a hierarchical relationship with the multiple objects in the single pane. The computer program product may include executable code that, when executed, is configured to cause the data processing apparatus to display a subset of the additional objects and associated metadata in an additional examination frame, where the additional examination frame sized to fit within one of the additional single panes and where the subset of the additional objects displayed within the additional examination frame are sized larger than the additional objects outside of the additional examination frame. The computer program product may include executable code that, when executed, is configured to cause the data processing apparatus to display only objects in the single pane that are related to a selected additional object from one of the additional single panes.

In another general aspect, a computer-implemented method executes instructions stored on a computer-readable medium and the method includes displaying multiple objects in a single pane, where the multiple objects are visual representations of real objects and the multiple objects are dynamically sized and spaced relative to one another to fit all of the objects in the single pane. The method also includes displaying a subset of the objects and associated metadata in an examination frame. The examination frame sized to fit within the single pane, where the subset of the objects displayed within the examination frame are sized larger than the objects outside of the examination frame.

Implementations may includes one or more of the features described above and below.

In another general aspect, an apparatus includes instructions stored on a computer-readable storage medium that are executable by at least one processor. The apparatus includes a rendering engine that is configured to cause the at least one processor to display multiple objects in a single pane, where the multiple objects are visual representations of real objects and the multiple objects are dynamically sized and spaced relative to one another to fit all of the objects in the single pane. The rendering engine is configured to cause the at least one processor to display a subset of the objects and associated metadata in an examination frame. The examination frame sized to fit within the single pane, where the subset of the objects displayed within the examination frame are sized larger than the objects outside of the examination frame.

Implementations may include one or more of the features describes above and below.

The details of one or more implementations are set forth in the accompanying drawings and the description below. Other features will be apparent from the description and drawings, and from the claims.

DETAILED DESCRIPTION

This document describes systems and techniques for displaying, viewing and navigating data models. In one exemplary implementation, the system and techniques enable the display of a very large number of objects in a single pane. The objects may be visual representations of data and/or real objects. Throughout this document, the visual representation of real objects means the visual representation of physical objects and/or the visual representation of virtual objects or logical objects including, without limitation, the visual representation of data including any flat set of data. Physical objects may include, without limitation, components in a network such as, for example, components in an information technology (IT) infrastructure. Components in an IT infrastructure may include servers, database servers, web servers, application servers, network hubs, routers, switches and other components.

The multiple objects in the graph may be dynamically sized and spaced relative to one another to fit all of the objects within the single pane. In this manner, all of the objects in the single pane may be displayed and viewed without any need for scrolling the pane in a horizontal direction. A status of all of the objects may be displayed and viewed simultaneously without scrolling. On a large screen display such as at a large screen operations center, all of the objects may viewed simultaneously in the single pane.

The systems and techniques also provides an examination frame within the single pane. The examination frame may be configured to display a subset of the objects and their associated attributes and/or metadata within the examination frame. The subset of objects displayed within the examination frame may be sized larger than the objects outside of the examination frame. In this manner, each object may be examined in its full size and provide a display of its related attributes and metadata. The objects displayed within the examination frame may be magnified in size relative to the other objects in the graph.

In other aspects, the examination frame may be configured to filter the objects that are displayed within the examination frame. The examination frame also may be configured to filter the type of information shown on the objects within the examination frame. Other aspects associated with the display of the objects, the type of objects displayed, the status of the objects and their associated attributes may be configured both within the single pane and within the examination frame.

In other aspects, this document describes systems and techniques for the display of objects that are related to one another in a relationship. For example, the objects may be related to one another in a hierarchical relationship. The display may be configured such that each level of the hierarchy may be displayed within a separate pane. For example, objects in a top level of the hierarchy (e.g., grandparent nodes, parent nodes, etc.) may be displayed in a top level pane, where each level of the hierarchy may be displayed in a separate pane. Objects in a lower level of the hierarchy (e.g., children nodes, grandchildren nodes, etc.) may be displayed in a lower level pane, where each level of the hierarchy may be displayed in a separate pane.

A selection of an object in a top level pane, meaning higher in the hierarchy, may cause the display of its associated children in a lower pane. In this manner, the hierarchical relationship between objects may be displayed with each level of the hierarchy displayed in a separate pane. Additionally, all objects in each level may be displayed without the need for scrolling the panes in a horizontal manner.

In other exemplary implementations, each hierarchy displayed in a separate pane may include an examination frame within that pane. In this manner, each object in a particular hierarchy may be displayed in its full size and include selected metadata and/or attributes.

Figure 1:
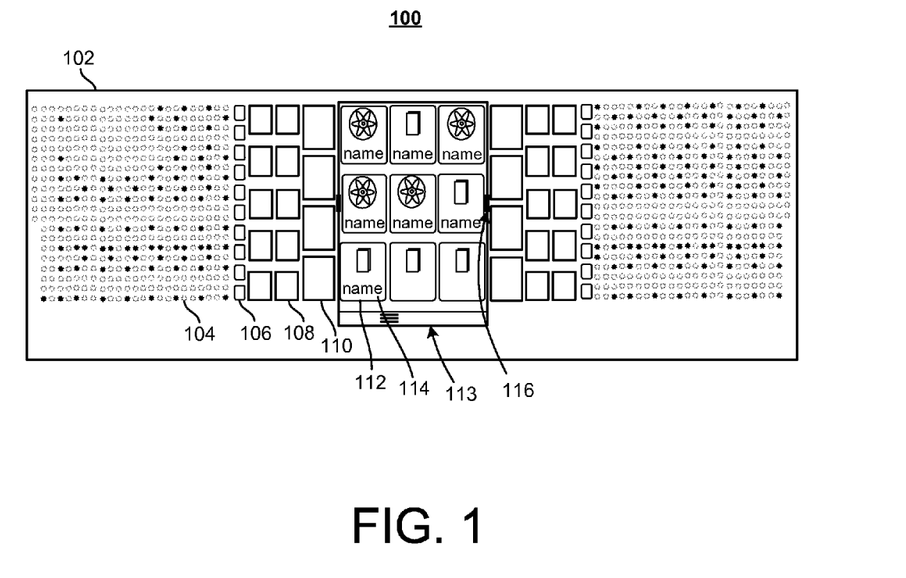
FIG. 1 is a schematic of an exemplary screen shot for a display of multiple objects in a single pane.

Referring to FIG. 1, an exemplary schematic illustrates an exemplary screenshot 100 of a display of objects. The screenshot 100 includes a single pane 102 that includes a display of multiple objects 104, 106, 108, 110 and 112. The objects displayed in the single pane 102 may be visual representations of real objects, as defined above. The underlying data related to the objects may be stored in one or more computing devices and displayed in the single pane 102. In other exemplary implementations, the objects may represent a graph of a data model, where the data model may include multiple thousands of nodes.

The objects 104, 106, 108, 110 and 112 may be associated with attributes and/or metadata. Throughout this document, the terms metadata and attributes may be used interchangeably to mean the same thing. The attributes may include, for example, an object name, a status, a type of object, event information including an event count, an importance rating, an icon representation, and any other type of attribute that may be associated with data in a database. The attributes may be selectable and configurable such that the objects displayed in the single pane 102 may indicate one or more of their attributes.

In one exemplary implementation, a status attribute for an object may be indicated through the use of one or more different colors and/or through the use of shading including the use of different gradations of shading. In this example of FIG. 1, shading may be used to indicate a status of the object. For instance, a shaded object may indicate one status and a non-shaded object may indicate a different status. Other indicators may be used to indicate a status attribute. The indicators may change as the status attribute changes such that the representation of the objects in the single pane dynamically changes based on real-time or near real-time changes in attributes.

In one exemplary implementation, the objects 104, 106, 108, 110 and 112 may represent nodes in a computer network, such as an IT infrastructure, that are being monitored by a user or administrator of the network. The single pane 102 enables the user to view and monitor all of the nodes in the computer network without the need for scrolling to other viewpoints off of the screen. As can be seen from the screenshot 100, there is no horizontal scrollbar present or required. Instead, all of the objects are viewable and displayed within the single pane 102.

As discussed above, attributes of each of the nodes in the computer network also may be displayed in the single pane 102. For example, a status attribute may be indicated through the use of one or more colors or shading. In this manner, a user who is monitoring the status of the network and the nodes in the network may determine a status of each of the monitored objects in a single glance without scrolling. The objects are all viewable along with an indication of their status on a single page on a single screen. Other attributes also may be displayed. For instance, a shape of the object may be used to indicate a particular attribute, where different shapes have different attribute meanings. The user who is monitoring the network may use the different shapes of the objects to identify different attributes for the objects.

In one exemplary implementation, the objects 104, 106, 108, 110 and 112 in the single pane 102 may be sorted using one or more of the object attributes. For example, the objects may be sorted within the single pane 102 based on a status of the object. In this manner, all objects having one status may be grouped together in one section of the single pane and objects having a different status may be grouped together in another section of the single pane such as, for example, from right to left, from left to right, from top to bottom or from bottom to top within the single pane 102.

In other examples, the objects 104, 106, 108, 110 and 112 may be sorted based on a name of the object or a type of the object. For example, if the objects represent nodes in a computer network, where the nodes include different types of network components, the objects may be sorted within the single pane based on the type of network component.

In other examples, the objects may be sorted based on a geographic location attribute of the object. For example, if the objects represent nodes in a computer network, the objects may be sorted based on a geographic location of the particular network component. For instance, nodes located on the west coast of the United States may be sorted such that they are displayed to the left of the display in the single pane 102. Nodes of the computer network that are located in the Midwest of the United States may be displayed in the middle of the single pane 102. Nodes that are located on the east coast of the United States may be displayed on the right side of the single pane 102. In this manner, a user who is monitoring a status of the computer network represented by the objects may determine if a problem exists in a particular location by looking at a status indicator of the objects in relation to the geographic location of the particular node. The single pane view of all of the objects enables a user to determine, at a glance, if there is a pattern or other indicated failure related to the objects based on a sorted geographic location attribute.

In another exemplary implementation, the objects displayed in the single pane 102 may be filtered such that only objects having certain attributes are displayed. For example, if the objects represent nodes in a computer network, then a user may select to filter the objects based on a type of network component represented by each object. In this manner, the user may choose to display, for example, only the server components in the network. Alternatively, the monitor may display a combination of only the routers and switches in the network and no other components. Any combination of one or more attributes may be used to filter the objects such that only selected objects meeting the filter criteria are displayed within the single pane 102. Furthermore, as discussed above, the filtered objects also may be sorted based on one or more attributes as selected by a user.

In one exemplary implementation, the objects 104, 106, 108, 110 and 112 are dynamically sized and spaced relative to one another such that all of the objects fit within the single pane 102. The size and spacing of each object may be dependent on a total number of objects within the single pane 102 such that all of the objects are viewable without the need for horizontal scrolling. For example, a total number of objects in the dataset that are to be represented in the single pane may be calculated and that number may be used to determine the sizing and spacing of each object in the single pane such that each object in the dataset is viewable within the single pane 102 on a single page. Fewer objects in the dataset may allow for a larger representation of the object in the single pane. Datasets with a large number of objects may allow for the majority of objects to be displayed in one size and some of the objects to be displayed in a different size.

As illustrated in the screenshot 100, the objects 104, 106, 108, 110 and 112 are depicted in various sizes and spacing in relation to one another. In some exemplary implementations, the configuration of the sizing and spacing of the objects may be configurable. In this manner, minimum and maximum sizes of objects may be set by a user. The number of objects in a particular dataset may determine a minimum and a maximum size for the objects based on the number of objects within the particular dataset. Thus, each dataset may have different minimum and maximum sizes because the number of objects may vary from one dataset to another dataset.

The single pane 102 also may include an examination frame 113, where the examination frame is sized to fit within the single pane 102. The examination frame 113 may display a subset of the objects and their associated metadata within the examination frame 113. For example, in the screenshot 100, the examination frame 113 displays a subset of the objects 112 within the examination frame 113. The objects 112 within the examination frame 113 may be displayed in full size and also may include one or more attributes associated with the objects. For example, the objects 112 may include an icon and name attribute 114 such that the user may view the displayed attributes in full size. The objects 112 may be represented as objects that are larger than the objects outside of the examination frame 113. The examination frame 113 may display the objects within the frame as magnified when compared with objects outside of the examination frame 113. In this manner, a user who is viewing and monitoring the status of the objects may see additional detail and information about the objects within the examination frame 113 as compared to objects outside of the examination frame 113.

While the objects both inside the single pane 102 and the examination frame 113 are represented as dots or squares, other shapes and sizes may be used to represent the objects within the single pane 102 and the examination frame 113. For example, the objects may be represented by other symbols or identifiers or shapes that may change throughout the single pane 102 and within the examination frame 113.

In one exemplary implementation, the attributes that are displayed within the examination frame 113 may be configurable. In this manner, a user may select the attributes to display within the examination frame 113 for each object 112 that appears within the frame. In this example, the attributes include a status of the object as indicated by the shading of the object, a name of the object, and an icon representing a type of the object. Many other types of attributes may be included and displayed for each object within the examination frame 113. Attributes may be selected and/or deselected such that different combinations of attributes may be displayed for each object 112 within the examination frame 113.

The objects 104, 106, 108 and 110 may be dynamically sized and spaced relative to their position with respect to the examination frame 113. For example, objects that are further away from the examination frame 113, such as objects 104, may be reduced in size and the spacing of the objects also may be reduced. Objects that are closer to the examination frame 113 may be gradually increased in size as they approach the examination frame 113. For example, objects 106 are larger than the objects 104 because they are closer to the examination frame than objects 104. Similarly, objects 108 appear larger than objects 106 and objects 104 because the objects 108 are closer to the examination frame 113 than the other objects 104 and 106. Objects 110 are displayed as larger objects than objects 104, 106 and 108 because the objects 110 are closest to the examination frame 113. While not illustrated in this example, objects that are larger because of their positioning relative to the examination frame, but are not within the examination frame, also may include a display of one or more attributes associated with the particular object. For example, the objects 110 may be configured to display a name attribute or one or more other selected attributes.

In one exemplary implementation, the examination frame may be moveable within the single pane 102. In this manner, a user may move the examination frame anywhere within the single pane 102. The spacing and sizing of the objects within the single pane 102 and the subset of objects within the examination frame 113 dynamically change in relation to their position with respect to the examination frame 113. As the examination frame 113 is moved within the pane 102, the size and spacing of the objects 104, 106, 108, 110 and 112 changes. The examination frame 113 may be moved horizontally within the single pane 102. The user may use any input device such as, for example, a mouse, a track pad, a pointer, or other input device including a touch screen to grab and drag the examination frame 113 within the single pane 102.

The ability to move the examination frame 113 enables a monitor of the objects to move the examination frame 113 to an area of interest within the single pane in order to gain a more magnified view of particular objects and their associated attributes. For example, if the objects represent a computer network and a monitor is viewing the single screen to monitor a status of the computer network as indicated by a color or shading of the objects, then the user may move the examination frame 113 to get more detailed information on any object within the single pane 102. A user may simply drag the examination frame 113 over the objects of interest in order to see more detailed information related to the object.

As the examination frame 113 is moved within the single pane 102, the sizing and spacing of the objects outside of the examination frame also changes dynamically. As the examination frame 113 is moved, objects will enter and exit the examination frame 113. As the objects approach the moving examination frame 113, their size may increase. When objects enter the examination frame 113, a full size and/or the largest possible size of the object may be displayed along with a maximum number of attributes associated with the objects in the examination frame 113. As objects exit the examination frame 113, they may decrease in size and gradually continue to decrease in size as they move further away from the examination frame 113. Thus, the size and spacing of objects within the single pane 102 may be a function of both the number of objects within the single pane 102 and their position relative to the examination frame 113. Objects that are furthest away from the examination frame 113 may be the smallest size. The size of the objects may gradually increase as they get closer to the examination frame 113.

In one exemplary implementation, the size of the examination frame 113 may be configurable. The width of the examination frame 113 may be sized using a selector bar 116 to increase or decrease the width of the examination frame 113. The maximum size of the examination frame 113 may be limited based on a number of objects within the single pane 102. For example, the total number of objects may be counted and the count of the objects may be used to determine the largest number of objects that can be rendered within the examination frame 113 and still fit all of the objects within the single pane 102 without the need for any horizontal scrolling. As the number of objects within the single pane 102 changes, the maximum size of the examination frame 113 also may change. Thus, the number of objects displayed within the examination frame 113 also may change.

In the example of FIG. 1, the examination frame 113 includes three columns of objects and their associated attributes. The examination frame 113 may be resized by the user to include more columns or may be resized by the user to include fewer columns. The size of the objects and their spacing relative to one another, both inside and outside the examination frame 113, may change dynamically based on the size of the examination frame 113.

In one exemplary implementation, the examination frame 113 may be configured to filter the objects that appear within the examination frame 113. For example, a user may use selectable criteria to determine which objects are to appear within the examination frame 113. In this manner, a user may focus on desired objects as the examination frame is either stationary within the single pane 102 or as it is moved within the single pane 102. As the examination frame 113 is moved within the single pane 102, only objects meeting the filter criteria will be displayed within the examination frame 113 along with their associated attributes.

In one exemplary implementation, the objects may represent nodes in a computer network. A user may set a filter to show only objects with a particular status within the examination frame 113. For instance, a filter may be set to display only objects having a trouble status, such as a shaded indicator, to display within the examination frame 113. In this manner, a user may focus on the desired troubled objects and move the examination frame to desired locations within the single pane and obtain a full size view and detail of attributes associated with the objects meeting the selected filter criteria. Other attributes may be used as filter criteria to determine which objects may appear in the examination frame 113.

In another exemplar implementation, additional panes may be displayed to show other data having a relationship with objects among the panes. For example, referring to FIG. 2, an exemplary schematic of a screenshot 200 illustrates a first pane 202 and a second pane 220. The first pane 202 may be similar to and configured in a manner similar to the single pane 102 of FIG. 1. The first pane 202 may include multiple objects 204, 206, 208, 210 and 212. The objects 204, 206, 208, 210 and 212 may be similar to the objects 104, 106, 108, 110 and 112 of FIG. 1. The objects within the first pane 202 may be dynamically sized and spaced relative to one another to fit all of the objects in the first pane 202, without the need for horizontal scrolling. Just like the objects within the first pane 102 of FIG. 1, the objects within the first pane 202 may be displayed without the need for horizontal scrolling. The first pane 202 also may include an examination frame 213, which may function in the same manner as the examination frame 113 of FIG. 1. As described above, the examination frame 213 may be resized by the user using the sizing bar 216 and the examination frame 213 may be moved within the first pane 202. The objects 204, 206, 208, 210 and 212 within the first pane 202 may be sized and spaced relative to the examination frame 213.

Figure 2:
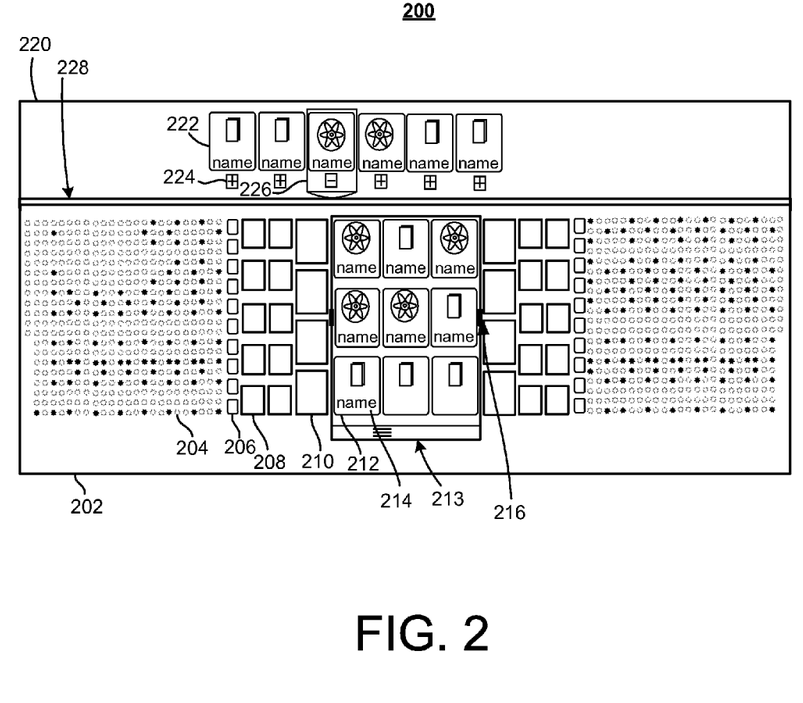
FIG. 2 is a schematic of an exemplary screen shot for a display of multiple objects arranged in a hierarchy with each level of the hierarchy in a separate pane.

The data represented by the objects within the first pane 202 and the objects within the second pane 220 may be related. For example, the objects representing the real objects in the first pane 202 may be in a hierarchical relationship with the objects representing the real objects in the second pane 220. In this manner, each level of the hierarchy may be displayed in a separate pane. For instance, a top level of the hierarchy of the data may be displayed and represented by objects in the second pane 220. Objects that are lower in the hierarchy and that may have a child relationship with objects in the top hierarchy may be displayed in the first pane 202.

Objects that appear in a pane that represent a higher level in the hierarchy may be selectable and expanded to show objects in a direct chain in that selected object's hierarchy. Each object, such as object 222, in a top level pane may include a selector 224 to show children of the selected object in a lower pane, such as the first pane 202. A selection of an object in the second pane 220 may cause the first pane 202 to open and to populate the first pane 202 with objects related to the selected object. The selector 224 allows a user to select a desired object and to show objects related to the selected object in the first pane 202. The "+" indicator in the selector 224 indicates that the object 222 may be selected and includes children objects that when selected will be displayed in the first pane 202. The "−" indicator on the selector indicates that the current children objects are being displayed in the pane below and a selection of it will collapse the lower pane.

In this exemplary screenshot 200, the object 226 has been selected. An additional frame around the object indicates the selection of the object 226. Upon selection of an object in the second pane 220, all objects in the selected object's tree or hierarchy are displayed in a lower pane, such as the first pane 202. In this example, the selected object 226 includes all of the objects in its hierarchy that are displayed in the first pane 202. When an object is expanded using the selector 224 at the bottom of the object, the objects in the first pane 202 change. For example, if another object in the second pane 220 is selected, then the objects in the first pane 202 will change to display the objects that are in the hierarchical relationship with the newly selected object. Each of the selected objects in the pane 220 may include a different number of children objects. The relationship between the objects is representative of the relationship of the underlying data, which may be stored in a database.

The selection of objects in the second pane 220 may determine whether or not any objects or even if the first pane 202 is displayed at all. For example, if no objects are selected in the second pane 220, then the first pane 202 may not be displayed at all. When an object is selected in the second pane 220, any objects associated with the selected object are displayed in the first pane. The first pane 202 may be opened and populated in response to the selection of an object in the second pane 220. A selection of a new object in the second pane 220 repopulates the objects within the first pane 202 based on the objects that have a relationship with the newly selected object in the second pane 220.

In one exemplary implementation, the objects displayed in the second pane 220 may be configurable to show one or more selected attributes just like the objects in the first pane 202. The objects in the second pane 220 may be represented by one or more different types of visual representations that are configurable by the user. As discussed above with respect to FIG. 1, the objects may indicate a status through the use of indicators including the use of colors and/or shading.

In one exemplary implementation, the size of the panes 220 and 202 may be changed. For example, the selector bar 228 may be moved vertically to change the size of the panes 220 and 202. The size of the pane 202 may be dependent upon a total number of objects displayed within the pane 202 such that all of the objects are always displayed without the need for any horizontal scrolling.

Figure 3:
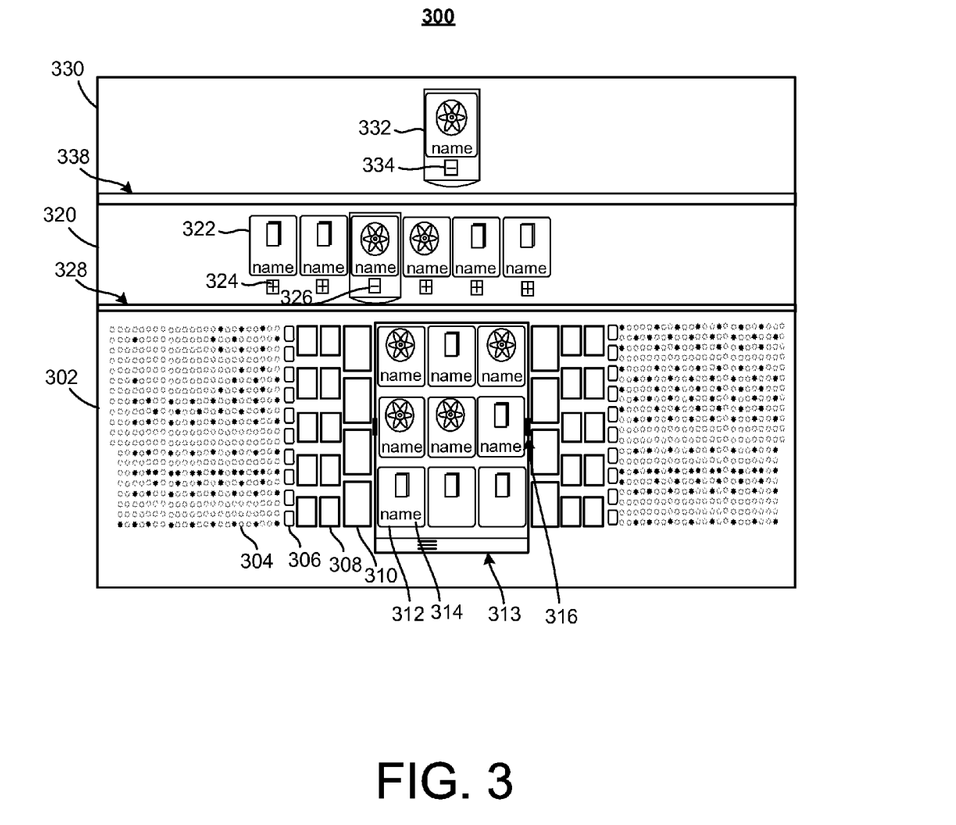
FIG. 3 is a schematic of an exemplary screen shot for a display of multiple objects arranged in a hierarchy with each level of the hierarchy in a separate pane.

In other exemplary implementations, additional panes may be displayed to represent data, such as data that is in a hierarchical relationship. Referring to FIG. 3, an exemplary schematic of a screenshot 300 illustrates multiple panes 302, 320 and 330. In this example, each of the panes may represent one hierarchical layer of the data such that each hierarchical layer has its own separate pane. The first pane 302 may be similar to the single pane 102 of FIG. 1 and the first pane 202 of FIG. 2 and include all of the functionality and features as described above. Similarly, the second pane 320 includes the same features and functionality as the second pane 220 of FIG. 2. In this manner, the first pane 302 includes multiple objects 304, 306, 308, 310 and 312. The first pane 302 includes an examination frame 313, which may be moved within the single pane 302, and may display one or more attributes 314. The examination frame 313 includes the same features and functionality as the examination frames 113 of FIG. 1 and 213 of FIG. 2, including the ability for a user to resize the examination frame using the resize bars 316.

The second pane 320 includes multiple objects, which may be selected using the selectors such as, for example, the selector 324. For example, the object 322 includes a selector 324. The "+" indicator in the selector 324 indicates that the object 322 may be selected and includes children objects that when selected will be displayed in the first pane 302. The "−" indicator on the selector indicates that the current children objects are being displayed in the pane below and a selection of it will collapse the lower pane. As objects in the second pane 320 are selected, the objects within the first pane 302 dynamically change to show the children objects for the selected object.

The third pane 330 includes an object 332 and a selector 334. A selection of the object 332 using the selector 334 opens the second pane 320 and displays the objects that are children of the object 332. Selecting the object 332 again using the selector 334 may act to collapse the panes below it such that no objects are displayed in the panes 302 and 320.

In this example, the object 332 is the highest object in the hierarchy of the data being represented by the objects in the screenshot 300. The second level of objects appear in the second pane 320. A selection of one of the objects in the second pane 320 displays its associated children objects in the first pane 302. Due to the large number of children objects in the first pane 302, an examination frame 313 is provided to view desired objects in full size including their associated attributes.

Figure 4:
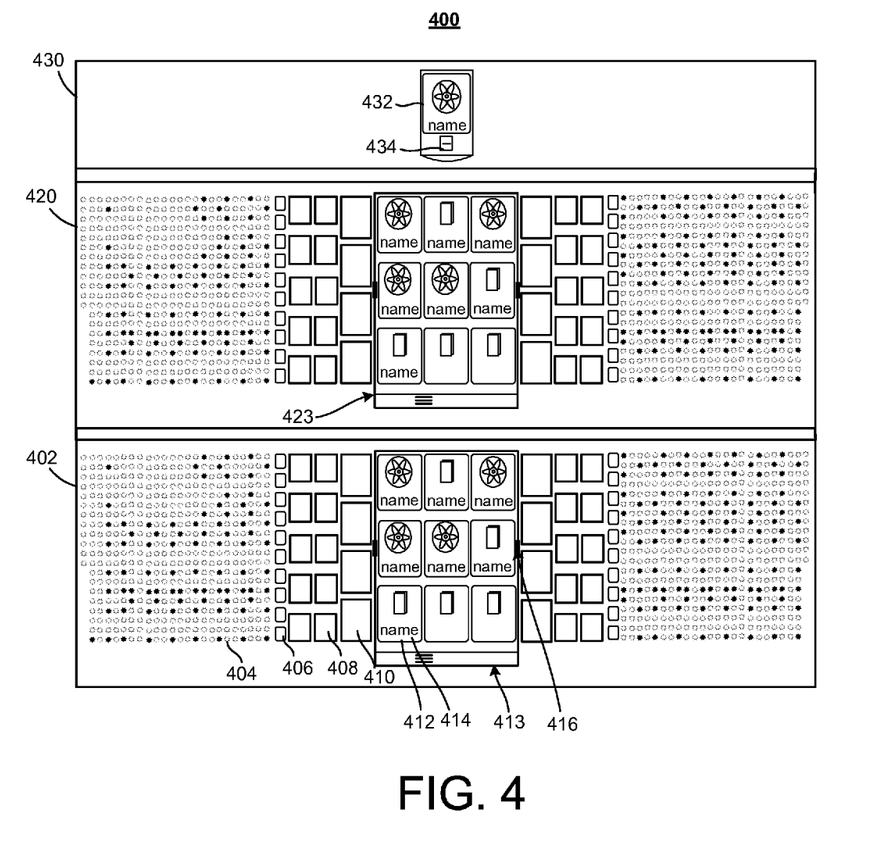
FIG. 4 is a schematic of an exemplary screen shot for a display of multiple objects arranged in a hierarchy with each level of the hierarchy in a separate pane.

Should one of the other layers in the hierarchy include a large number of objects, then other panes also may include an examination frame. Referring to FIG. 4, an exemplary schematic of a screenshot 400 illustrates multiple panes 402, 420 and 430. In this example, each of the panes may represent one hierarchical layer of the data such that each hierarchical layer has its own separate pane. The first pane 402 may be similar to the single pane 102 of FIG. 1, the first pane 202 of FIG. 2 and the first pane 302 of FIG. 3 and include all of the functionality and features as described above. In this manner, the first pane 402 includes multiple objects 404, 406, 408, 410 and 412. The first pane 402 includes an examination frame 413, which may be moved within the single pane 402, and may include a display of one or more attributes 414. The examination frame 413 includes the same features and functionality as the examination frames 113 of FIG. 1, 213 of FIG. 2 and 313 of FIG. 3, including the ability for a user to resize the examination frame using the resize bars 416.

The second pane 420 includes multiple objects, which may be selected using the selectors (not shown in this schematic). The second pane 420 also may include an examination frame 423. In this manner, an examination frame may appear in a window depending on a number of objects shown within the particular pane. Each pane that represents a single hierarchical layer may include its own examination frame. For example, when a number of objects reaches a certain number, then an examination frame may be automatically generated.

The examination frame 423 may include the same features and functionality as the examination frames 113 of FIG. 1, 213 of FIG. 2 and 313 of FIG. 3. In this manner, an object selected in the top pane 430 causes its related children objects to be displayed in the second pane 420. For example, the third pane 430 includes an object 432 and a selector 434. A selection of the object 432 using the selector 434 opens the second pane 420 and displays the objects that are children of the object 432. Selecting the object 432 again using the selector 434 may act to collapse the panes below it such that no objects are displayed in the panes 402 and 420.

Similar to the objects displayed in the first pane 402, the objects displayed in the second pane 420 are dynamically sized and spaced based on the number of objects and their relationship with one another. The objects in the second pane 420 also may be dynamically sized and spaced in relation to their relative position with respect to the examination frame 423. As the examination frame 423 is moved within the second pane 420, the sizing and spacing of the objects dynamically changes. Objects may enter and exit the examination frame 423 in the same manner as described above with respect to the examination frame 113 of FIG. 1, 213 of FIG. 2 and 313 of FIG. 3. The examination frame 423 and the examination frame 413 may be moved by the user independent of each other. In this manner, the user may bring into focus different objects within the different panes using the examination frames 413 and 423 independent of each other.

Figure 5:
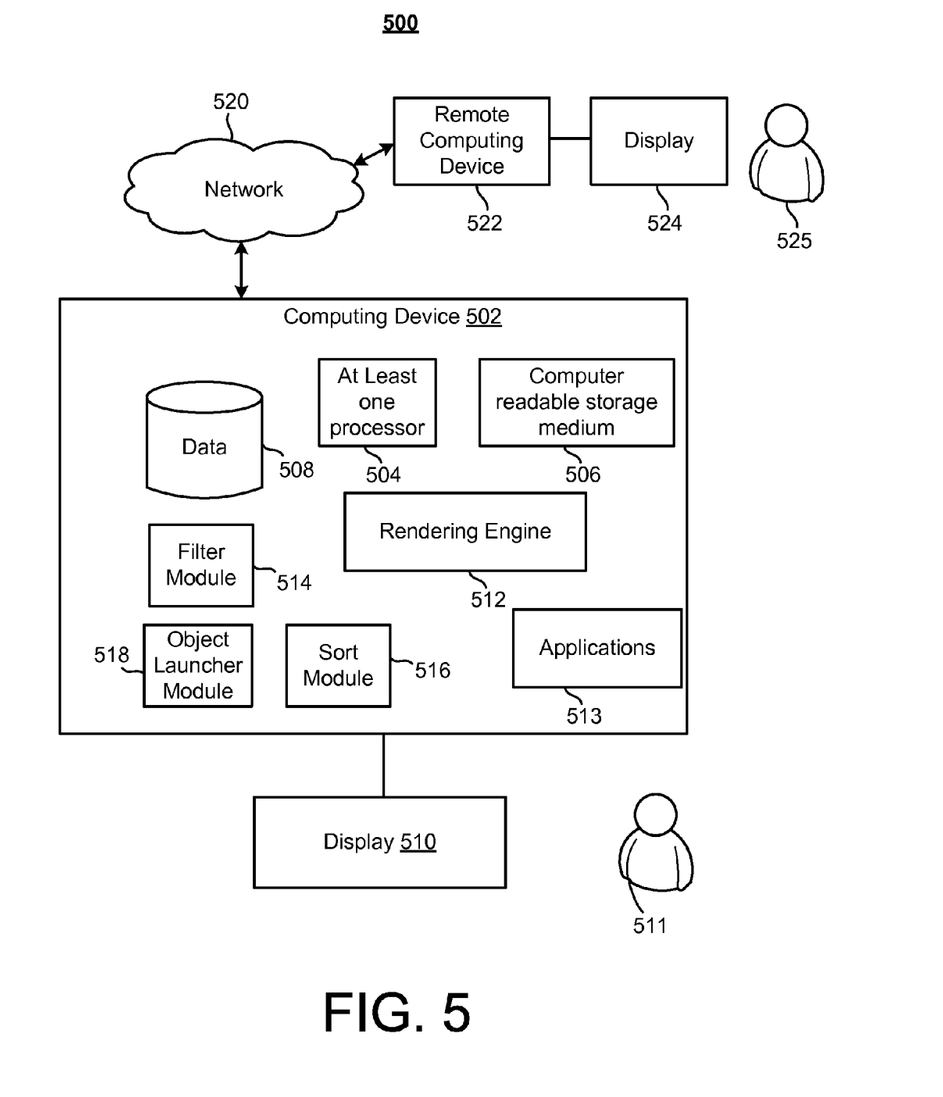
FIG. 5 is an exemplary block diagram of a system for displaying, viewing and navigating multiple objects.

Referring to FIG. 5, an exemplary block diagram of a system 500 is illustrated. The system 500 may include a computing device 502. The computing device 502 may generally represent virtually any computing device, which may be configured to process instructions and to communicate with other devices. For example, the computing device 502 may include a server, any standard desktop or personal computing device, any laptop, notebook, or netbook computer, any tablet computer, or any Smartphone or other mobile computing device. Such computing devices, and other computing devices, may be configured to access other devices through the network 520 in any conventional manner. For example, many computing devices 502 may include various types of network-related hardware/software which enable the computing device 502 to communicate over the public internet, private intranet, or other network, to thereby access other devices.

The computing device 502 may be operably connected to display 510. The display 510 may be understood to represent virtually any type of display, for example, a monitor, a touch screen monitor, or any other type of visual or auditory display. In this example, the display 510 may be the device on which the screenshots 100 of FIG. 1, 200 of FIG. 2, 300 of FIG. 3 and 400 of FIG. 4 may be rendered.

The computing device 502 may include at least one processor 504, a computer-readable storage medium 506 and data 508. That is, for example, the computing device 502 may rely on at least one processor 504 and also may rely on two or more processors executing in parallel to achieve a desired result. The processor 504 may be configured to execute instructions that are stored on the computer-related storage medium 506 and to cause the processor to perform certain actions and/or functions. Meanwhile, the computer-readable storage medium 506 may represent any conventional type of computer memory which may be used, for example, to store instructions which, when executed by the at least one processor 504, cause other components within the computer device 502 to perform various functions, and other relevant functions described herein.

The data 508 may be any type of data store or database that is configured to store and maintain data. The data may be in any type of database. The data may be arranged in any type of order and include various types of relationships among the data. For example, the data may be arranged in a hierarchical structure and include data that are in different layers of the hierarchy such as in a tree-structure. As discussed above, the data 508 may relate to real objects including, without limitation, physical objects and logical or virtual objects.

The data 508 also may include one or more attributes and/or metadata that is associated with the data. The attributes may be stored in conjunction with the data. The attributes may be selectable such that one or more of the attributes may be displayed on the display 510 in one of the panes or examination frames, as discussed above.

The computing device 502 also includes a rendering engine 512. The rendering engine 512 may be configured to operate in conjunction with the at least one processor 504 and the computer-readable storage medium 506 to process and render visual representations of the data 508 on the display 510. The rendering engine 512 may be configured to cause the processor 504 to display multiple objects in a single pane, where the multiple objects are visual representations of the data 508. For example, the rendering engine 512 may cause the at least one processor 504 to render visual representations of the objects such as the objects 104, 106, 108, 110 and 112 of FIG. 1 on a display 510. The rendering engine 512 may dynamically size and space the objects relative to one another to fit all of the objects in a single pane, such as a single pane 102 of FIG. 1, the first pane 202 of FIG. 2, the first pane 302 of FIG. 3 and the first pane 402 of FIG. 4.

The rendering engine 512 also may be configured to display a subset of the objects and associated metadata in an examination frame, such as the examination frames 113 of FIG. 1, 213 of FIG. 2, 313 of FIG. 3 and 413 and 423 of FIG. 4. The rendering engine 512 may size the examination frame to fit within a single pane and may dynamically change the size and spacing of objects within the single pane relative to their position with respect to the examination frame. The rendering engine 512 may use animation technology or other types of technologies to dynamically change the size and spacing of the objects in the pane in relation to an examination frame.

The rendering engine 512 also may be configured to respond to inputs from a user 511 to move the examination frame within the single pane. The rendering engine 512 also may be configured to change the size and spacing of the objects within the pane as the examination frame is being moved. The rendering engine 512 may be configured to display the objects within the examination frame as they enter and exit the frame. In one exemplary implementation, the objects displayed within the examination frame may be sized larger than the objects outside of the examination frame. In this manner, the objects displayed within the examination frame may be rendered in their full size and also may be displayed in conjunction with any selected attributes. Thus, the rendering engine 512 magnifies the object within the examination frame relative to other objects outside of the examination frame.

The computing device 502 also may include one or more applications 513. The applications 513 may include applications that work in conjunction with the rendering engine 512, the processor 504, the computer-readable storage medium 506 and the data 508 to render the objects in the panes and the examination frames on the display 510. In one exemplary implementation, the applications 513 may include a browser application that is used by a user 511 to assist in the display of the data. The applications 513 also may include one or more database manipulation programs that enable a user to configure, change, modify or update the data stored in the database 508.

The computing device 502 also may include a filter module 514, a sort module 516 and an object launcher module 518. The filter module 514 may be used to configure and set filter selection criteria to determine which objects may be displayed in the panes and/or in the examination frames. For example, the filter module 514 may be used to select certain criteria or attributes related to the data such that only objects meeting that criteria are displayed within one of the panes. Additionally, the filter module 514 may be used to select criteria to determine which objects meeting the selected criteria will be displayed within the examination frame. The filter module 514 is configurable and may enable the user 511 to select one or more attributes in order to filter the objects that are displayed on the display 510.

The sort module 516 may be configured to enable a user to select the sort criteria on which to order the objects within a pane and/or the examination frame. As discussed above with respect to FIG. 1, the objects within a pane may be sorted based on one or more selected attributes. The sort module 516 may enable the user 511 to select one or more of the attributes in which to sort the display of the objects on the display 510 within the panes.

The object launcher module 518 may be configured to enable a user to select one or more objects and to perform additional actions related to the selected objects. For example, the object launcher module 518 may be configured to enable a user to select, for example, by a right click of a mouse, an object within an examination frame and to perform other actions related to the selected object including launching the selected object in another pane or other display page on the display 510. The object launcher module 518 also may be used to allow selection of an object to display additional information including all attribute information related to the selected object. The object launcher module 518 may be configured to allow for selection of multiple objects at the same time in order to compare information related to one or more of the objects or to view information about the selected objects simultaneously in a same or different screen.

In one exemplary implementation, a remote computing device 522 may connect to the computing device 502 through a network 520. The remote computing device 522 may be any type of computing device such as those described above with respect to the computing device 502. The remote computing device 522 may enable a user 525 to view the data 508 as rendered by the rendering engine 512 on a display 524 connected to the remote computing device 522. In this manner, a remote computing device and display 524 may remotely connect to the computing device 502 through the network 520 in order to have the rendering engine 512 display the objects within the single panes and/or examination frames on the remote computing device 522 instead of or in addition to being displayed on the display 510 connected to the computing device 502. The remote computing device 522 may access the data and the functionality of the rendering engine 512 using one or more applications including, for example, a browser application to access the rendered data over the network 520 such that the information including the objects is displayed on the display 524 for viewing and manipulation by the user 525.

Figure 6:
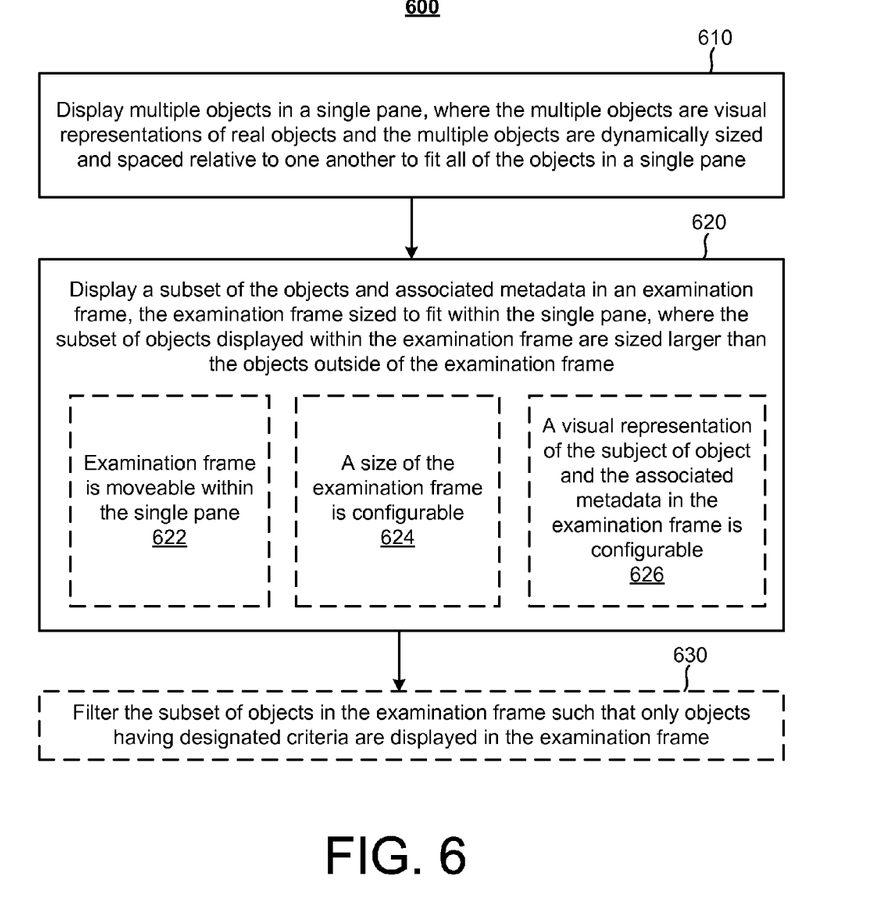
FIG. 6 is a flowchart illustrating example operations of the system of FIG. 5.

Referring to FIG. 6, an exemplary flow diagram illustrates a process 600 related to the systems described above. Process 600 includes displaying multiple objects in a single pane, where the multiple objects are visual representations of real objects and the multiple objects are dynamically sized and spaced relative to one another to fit all of the objects in a single pane (610). For example, as discussed above with respect to FIGS. 1-5, the rendering engine 512 may be configured to display multiple objects in a single pane such as the single pane 102 of FIG. 1. The multiple objects such as objects 104, 106, 108, 110 and 112 of FIG. 1 are visual representations of data stored, for example, in database 508 of FIG. 5. As discussed above, the objects may be dynamically sized and spaced using the rendering engine 512 relative to one another to fit all of the objects in the single pane.

Process 600 also includes displaying a subset of the objects and associated metadata in an examination frame, the examination frame being sized to fit within the single pane, where the subset of the objects displayed within the examination frame are sized larger than the objects outside of the examination frame (620). For example, the rendering engine 512 may be configured to render an examination frame, such as examination frame 113 of FIG. 1 that is designed to display a subset of the objects within the frame of the single pane. In this manner, the examination frame may be used to focus on particular objects within the single frame and to display them in a larger size such that more detail related to the object within the frame including selected attributes is more readily visible to the user.

In one exemplary implementation, the examination frame is movable within the single pane (622). For example, the examination frame 113 of FIG. 1 may be selected by the user and moved within the single pane 102. The examination frame 113 may traverse along the entire horizontal length of the single pane 102. As discussed above with respect to FIG. 5, the rendering engine 512 may be configured to respond to user inputs to move the examination frame within the single pane and to dynamically change the sizing and the spacing of the objects relative to the movement of the examination frame.

In another exemplary implementation, a size of the examination frame may be configurable (624). For example, a user may select the bar 116 of FIG. 1 along the side of the examination frame and increase or decrease the size of the examination frame. As discussed above, the resizing of the examination frame may be dependent upon a total number of objects within the single pane 102. A maximum width may be set based on a number of the objects such that all of the objects in the single pane may still be displayed without the need for a horizontal scrollbar.

In another exemplary implementation, a visual representation of the subset of objects and the associated metadata in the examination frame is configurable (626). As discussed above, the filter module 514 may be used to select one or more criteria that is applied to the objects to determine which objects may be displayed within the examination frame. Additionally, attributes stored in the database 508 may be selected for display when an object appears in the examination frame.

In another exemplary implementation, the process 600 may include filtering the subset of objects in the examination frame such that only objects having designated criteria are displayed in the examination frame (630). For example, the filter module 514 may be used to select criteria to determine which modules may be displayed within the examination frame.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer-readable storage medium embodying a computer program product, the computer program product including executable code that, when executed, is configured to cause a data processing apparatus to:
    display a data model of a computing environment including displaying multiple objects of the data model in a single pane, the multiple objects visually representing real objects of the computing environment, the multiple objects dynamically sized and spaced relative to one another to fit all of the objects in the single pane; and
    display a subset of the objects and associated metadata in an examination frame and filter the subset of objects in the examination frame such that only objects having designated criteria are displayed in the examination frame, the examination frame sized to fit within the single pane, the subset of the objects displayed within the examination frame sized larger than the objects outside of the examination frame.

2. The non-transitory computer-readable storage medium of claim 1 wherein:
    the examination frame is movable within the single pane, and the objects within the single pane are dynamically sized and spaced based on positions of the objects relative to a position of the examination frame.

3. The non-transitory computer-readable storage medium of claim 1 wherein a size of the examination frame is configurable.

4. The non-transitory computer-readable storage medium of claim 1 wherein a visual representation of the subset of the objects and the associated metadata in the examination frame is configurable.

5. The non-transitory computer-readable storage medium of claim 1 further comprising executable code that, when executed, is configured to cause the data processing apparatus to display additional objects in one or more additional single panes, wherein the additional objects in the additional single panes have a hierarchical relationship with the multiple objects in the single pane.

6. The non-transitory computer-readable storage medium of claim 5 further comprising executable code that, when executed, is configured to cause the data processing apparatus to display a subset of the additional objects and associated metadata in an additional examination frame, the additional examination frame sized to fit within one of the additional single panes, wherein the subset of the additional objects displayed within the additional examination frame are sized larger than the additional objects outside of the additional examination frame.

7. The non-transitory computer-readable storage medium of claim 5 further comprising executable code that, when executed, is configured to cause the data processing apparatus to display only objects in the single pane that are related to a selected additional object from one of the additional single panes.

8. The computer program product of claim 1 wherein the objects displayed outside of the examination frame gradually increase in size as the objects approach closer to the examination frame.

9. A computer-implemented method comprising:
    displaying, using a computer, a data model of a computing environment including displaying multiple objects of the data model in a single pane, the multiple objects visually representing real objects of the computing environment, the multiple objects dynamically sized and spaced relative to one another to fit all of the objects in the single pane; and
    displaying, using the computer, a subset of the objects and associated metadata in an examination frame and filtering the subset of objects in the examination frame such that only objects having designated criteria are displayed in the examination frame, the examination frame sized to fit within the single pane, the subset of the objects displayed within the examination frame sized larger than the objects outside of the examination frame.

10. The computer-implemented method of claim 9 wherein:
the examination frame is movable within the single pane, and
the objects within the single pane are dynamically sized and spaced based on positions of the objects relative to a position of the examination frame.

11. The computer-implemented method of claim 9 wherein a size of the examination frame is configurable.

12. The computer-implemented method of claim 9 wherein a visual representation of the subset of the objects and the associated metadata in the examination frame is configurable.

13. The computer-implemented method of claim 9 further comprising displaying, using the computer, additional objects in one or more additional single panes, wherein the additional objects in the additional single panes have a hierarchical relationship with the multiple objects in the single pane.

14. The computer-implemented method of claim 13 further comprising displaying, using the computer, a subset of the additional objects and associated metadata in an additional examination frame, the additional examination frame sized to fit within one of the additional single panes, wherein the subset of the additional objects displayed within the additional examination frame are sized larger than the additional objects outside of the additional examination frame.

15. The computer-implemented method of claim 13 further comprising displaying, using the computer, only objects in the single pane that are related to a selected additional object from one of the additional single panes.

16. The computer-implemented method of claim 9 wherein the objects displayed outside of the examination frame gradually increase in size as the objects approach closer to the examination frame.

17. An apparatus including instructions stored on a non-transitory computer-readable storage medium and executable by at least one processor, the apparatus comprising:
a rendering engine configured to cause the at least one processor to:
display a data model of a computing environment including displaying multiple objects of the data model in a single pane, the multiple objects visually representing real objects of the computing environment, the multiple objects dynamically sized and spaced relative to one another to fit all of the objects in the single pane;
display a subset of the objects and associated metadata in an examination frame, the examination frame sized to fit within the single pane, the subset of the objects displayed within the examination frame sized larger than the objects outside of the examination frame; and
display additional objects in one or more additional single panes, the additional objects in the additional single panes having a hierarchical relationship with the multiple objects in the single pane.

18. The apparatus of claim 17 wherein:
the examination frame is movable within the single pane, and
the objects within the single pane are dynamically sized and spaced based on positions of the objects relative to a position of the examination frame.

19. The apparatus of claim 17 wherein a size of the examination frame is configurable.

20. The apparatus of claim 17 wherein a visual representation of the subset of the objects and the associated metadata in the examination frame is configurable.

21. The apparatus of claim 17 wherein the rendering engine is configured to cause the at least one processor to filter the subset of objects in the examination frame such that only objects having designated criteria are displayed in the examination frame.

22. The apparatus of claim 17 wherein the rendering engine is configured to cause the at least one processor to display a subset of the additional objects and associated metadata in an additional examination frame, the additional examination frame sized to fit within one of the additional single panes, wherein the subset of the additional objects displayed within the additional examination frame are sized larger than the additional objects outside of the additional examination frame.

23. The apparatus of claim 17 wherein the rendering engine is configured to cause the at least one processor to display only objects in the single pane that are related to a selected additional object from one of the additional single panes.

24. The apparatus of claim 17 wherein the objects displayed outside of the examination frame gradually increase in size as the objects approach closer to the examination frame.

* * * * *